US010026960B2

(12) United States Patent
Lee et al.

(10) Patent No.: US 10,026,960 B2
(45) Date of Patent: *Jul. 17, 2018

(54) CATHODE ACTIVE MATERIAL COATING SOLUTION FOR SECONDARY BATTERY AND METHOD OF MANUFACTURING THE SAME

(71) Applicant: LG Chem, Ltd., Seoul (KR)

(72) Inventors: Dong Kwon Lee, Daejeon (KR); Seung Beom Cho, Daejeon (KR); Jun Seok Nho, Daejeon (KR); Wook Jang, Daejeon (KR)

(73) Assignee: LG Chem, Ltd. (KR)

( * ) Notice: Subject to any disclaimer, the term of this patent is extended or adjusted under 35 U.S.C. 154(b) by 187 days.

This patent is subject to a terminal disclaimer.

(21) Appl. No.: 14/419,508

(22) PCT Filed: Sep. 30, 2014

(86) PCT No.: PCT/KR2014/009194
§ 371 (c)(1),
(2) Date: Feb. 4, 2015

(87) PCT Pub. No.: WO2015/047024
PCT Pub. Date: Apr. 2, 2015

(65) Prior Publication Data
US 2015/0221941 A1  Aug. 6, 2015

(30) Foreign Application Priority Data

Sep. 30, 2013 (KR) .................. 10-2013-0117032
Sep. 29, 2014 (KR) .................. 10-2014-0130375

(51) Int. Cl.
| H01M 4/525 | (2010.01) |
| H01M 4/62 | (2006.01) |
| H01M 10/0525 | (2010.01) |
| H01M 4/36 | (2006.01) |

(52) U.S. Cl.
CPC ............ *H01M 4/525* (2013.01); *H01M 4/62* (2013.01); *H01M 4/366* (2013.01); *H01M 10/0525* (2013.01)

(58) Field of Classification Search
CPC .... H01M 4/525; H01M 4/62; H01M 10/0525; H01M 4/366
See application file for complete search history.

(56) References Cited

U.S. PATENT DOCUMENTS

| 6,110,442 A | 8/2000 | Xia et al. |
| 2004/0258986 A1 | 12/2004 | Shen et al. |
| 2005/0175899 A1 | 8/2005 | Noda et al. |
| 2007/0122338 A1 | 5/2007 | Park et al. |
| 2008/0113269 A1 | 5/2008 | Yamamoto et al. |
| 2009/0004563 A1 | 1/2009 | Zhong |
| 2009/0253042 A1* | 10/2009 | Sun ............... H01M 4/136 429/231.95 |
| 2010/0233541 A1 | 9/2010 | Sano |
| 2011/0108760 A1 | 5/2011 | Mukainakano et al. |
| 2011/0226985 A1 | 9/2011 | Park et al. |
| 2011/0274973 A1 | 11/2011 | Sheem et al. |
| 2012/0326078 A1 | 12/2012 | Chung et al. |
| 2013/0149227 A1 | 6/2013 | Chon et al. |
| 2013/0149616 A1 | 6/2013 | Lee et al. |
| 2013/0224570 A1 | 8/2013 | Sasaki et al. |
| 2013/0236788 A1 | 9/2013 | Tsunozaki et al. |
| 2014/0272583 A1 | 9/2014 | Hellring et al. |
| 2014/0308576 A1 | 10/2014 | Gaben et al. |
| 2014/0339085 A1 | 11/2014 | Bouyer et al. |
| 2015/0104713 A1 | 4/2015 | Gaben et al. |

FOREIGN PATENT DOCUMENTS

| CN | 1627550 A | 6/2005 |
| CN | 101308925 A | 11/2008 |
| CN | 101510606 A | 8/2009 |
| CN | 101515644 A | 8/2009 |
| CN | 102185141 A | 9/2011 |
| CN | 102195034 A | 9/2011 |
| CN | 102237523 A | 11/2011 |
| CN | 102931384 A | 2/2013 |
| CN | 102969497 A | 3/2013 |
| CN | 103107337 A | 5/2013 |
| EP | 2096692 A1 | 9/2009 |
| JP | 2003500318 A | 1/2003 |
| JP | 2007039266 A | 2/2007 |
| JP | 2007242318 A | 9/2007 |
| JP | 2010218838 A | 9/2010 |

(Continued)

OTHER PUBLICATIONS

English Translation of KR20120021674.*
English Translation of KR101249055.*
International Search Report for Application No. PCT/KR2014/009194 dated Jan. 15, 2015.
Extended Search Report from European Application No. 14825240.5, dated Sep. 24, 2015.
Extended Search Report from European Application No. 14827702.3, dated Oct. 1, 2015.
Extended Search Report from European Application No. 14827995, dated Oct. 1, 2015.
International Search Report for Application No. PCT/KR2014/009192 dated Jan. 15, 2015.

(Continued)

*Primary Examiner* — Peter F Godenschwager
*Assistant Examiner* — Andrew J. Oyer
(74) *Attorney, Agent, or Firm* — Lerner, David, Littenberg, Krumholz & Mentlik, LLP

(57) ABSTRACT

Provided are a method of manufacturing a cathode active material coating solution for a secondary battery including preparing a mixed solution by dispersing a metal precursor and a chelating agent in a glycol-based solvent, performing primary heating on the mixed solution, and performing secondary heating on the mixed solution, and a cathode active material coating solution for a secondary battery manufactured by the above method.

18 Claims, 1 Drawing Sheet

(56) References Cited

FOREIGN PATENT DOCUMENTS

| | | | |
|---|---|---|---|
| JP | 2013093167 | A | 5/2013 |
| JP | 2013107815 | A | 6/2013 |
| JP | 2013191516 | A | 9/2013 |
| JP | 2013539167 | A | 10/2013 |
| KR | 19990073753 | A | 10/1999 |
| KR | 100366058 | A | 4/2001 |
| KR | 20010029695 | A | 4/2001 |
| KR | 100813014 | B1 | 3/2008 |
| KR | 20080099131 | A | 11/2008 |
| KR | 20090093165 | A | 9/2009 |
| KR | 20110017253 | A | 2/2011 |
| KR | 101249055 | * | 3/2012 |
| KR | 20120021674 | A | 3/2012 |
| TW | 567632 | B | 12/2003 |
| WO | 2009105773 | A2 | 8/2009 |
| WO | 2012057289 | A1 | 5/2012 |
| WO | 2013064773 | A1 | 5/2013 |
| WO | 2013064776 | A1 | 5/2013 |
| WO | 2013064779 | A1 | 5/2013 |
| WO | 2013064781 | A1 | 5/2013 |

OTHER PUBLICATIONS

International Search Report for Application No. PCT/KR2014/009195 dated Jan. 14, 2015.
Liu, et al., "Synthesis and Electrochemical Studies of Spinel Phase $LiMn_2O_4$, Cathode Materials Prepared by the Pechini Process." Journal of the Electrochemical Society, vol. 143, No. 3, Mar. 1, 1996, pp. 879-884, XP002032962.
Office Action from Chinese Application No. 201480002134.5, dated Jun. 2, 2016.
Wang, Xiong, et al., Citric acid-assisted sol-gel synthesis of nanocrystalline $LiMn_2O_4$ spinel as cathode material, Journal of Crystal Growth, Aug. 2003, pp. 123-127, vol. 256, Issues 1-2.
Chinese Search Report from Application No. 201480021345, dated Aug. 30, 2017.
Chen et al., "Electrochemical studies on $LiCoO_2$ surface coated with $Y_3Al_5O_{12}$ for lithium-ion cells," Journal of Power Sources, vol. 189, accepted Sep. 15, 2008, pp. 279-287.
Simner et al., "Solution processing approaches for solid electrolytes and electrode materials," Journal of Materials Research, vol. 13, No. 4, Apr. 1998, pp. 866-874.

* cited by examiner

[Fig. 1]
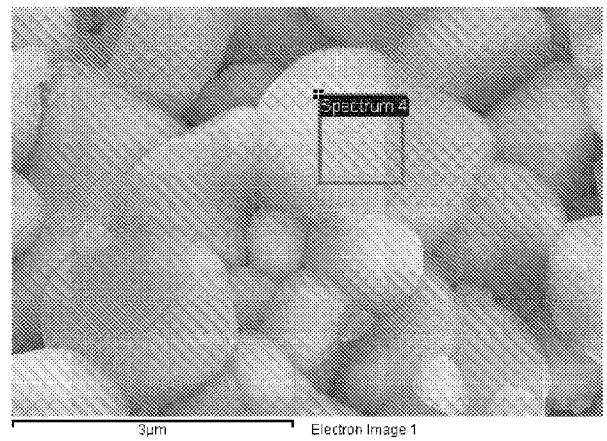
[Fig. 2]
[Fig. 3]
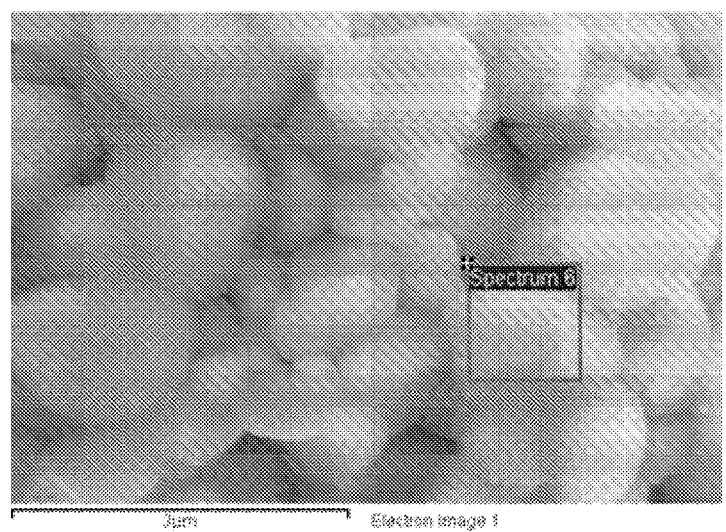

CATHODE ACTIVE MATERIAL COATING SOLUTION FOR SECONDARY BATTERY AND METHOD OF MANUFACTURING THE SAME

CROSS-REFERENCE TO RELATED APPLICATION

This application is a national phase entry under 35 U.S.C. § 371 of International Application No. PCT/KR2014/009194, filed Sep. 30, 2014, which claims priority to Korean Patent Application No. 10-2013-0117032, filed Sep. 30, 2013 and Korean Patent Application No. 10-2014-0130375, filed Sep. 29, 2014, the disclosures of which are incorporated herein by reference.

TECHNICAL FIELD

The present invention relates to a cathode active material coating solution for a secondary battery for preparing a cathode active material for a secondary battery having improved thermal stability and capacity characteristics, and a method of manufacturing the cathode active material coating solution.

BACKGROUND ART

In line with the increasing use of mobile devices and vehicles, demand for secondary batteries as their energy sources has been rapidly increased. As the secondary batteries, lithium secondary batteries having high energy density, high voltage, long cycle life, and low self-discharging rate have been commercialized and widely used.

A lithium secondary battery may be largely composed of a cathode active material, an anode active material, a separator, and an electrolyte. Specifically, a carbon material has been used as a main component of the anode active material, and in addition, research into using lithium metal, a sulfur compound, a silicon compound, and a tin compound has been actively conducted. Also, a layered structure, lithium-containing cobalt oxide ($LiCoO_2$) has been mainly used as the cathode active material, and in addition, lithium metal compounds having a layered structure (the metal includes manganese, cobalt, nickel, etc.), lithium-containing manganese oxides having a spinel structure ($LiMnO_2$ and $LiMn_2O_4$), and lithium-containing nickel oxide ($LiNiO_2$) have been commercialized.

With respect to $LiCoO_2$ which has currently been most widely used among the above cathode active materials due to excellent life characteristics and charge and discharge efficiency, it has limitations in being applied to high-capacity batteries for electric vehicles due to the fact that it has low structural stability, has high raw material costs, and causes environmental pollution. With respect to a lithium manganese oxide, such as $LiMnO_2$ and $LiMn_2O_4$, studied as an alternative material of $LiCoO_2$, it has high thermal stability and is inexpensive, but has disadvantages in that electrical conductivity is low, capacity is low, and electrode degradation rapidly occurs at high temperature due to poor high-temperature characteristics. With respect to the lithium-containing nickel oxide, it has battery characteristics of high discharge capacity, but has disadvantages in that it is difficult to be synthesized by a simple solid-state reaction and its cycle characteristics are low.

Therefore, there is an urgent need to develop a novel cathode active material having better high-temperature stability, lower manufacturing costs, and better cycle characteristics than cathode active materials that have been currently used.

DISCLOSURE OF THE INVENTION

Technical Problem

An aspect of the present invention provides a method of manufacturing a cathode active material coating solution for a secondary battery which may improve charge and discharge efficiency on the surface of a cathode active material during the preparation of the cathode active material.

Another aspect of the present invention provides a cathode active material coating solution manufactured by the above method.

Technical Solution

According to an aspect of the present invention, there is provided a method of manufacturing a cathode active material coating solution for a secondary battery including: preparing a mixed solution by dispersing a metal precursor and a chelating agent in a glycol-based solvent; performing primary heating on the mixed solution; and performing secondary heating on the mixed solution.

According to another aspect of the present invention, there is provided a cathode active material coating solution for a secondary battery manufactured by the above method.

The cathode active material coating solution for a secondary battery may be a metal glycolate coating solution.

Advantageous Effects

In the present invention, a cathode active material coating solution, which may form a metal oxide coating layer having a uniform thickness capable of improving charge and discharge efficiency on the surface of a cathode active material for a secondary battery, may be manufactured by mixing and heating a metal precursor compound and a chelating agent in the presence of a glycol-based solvent.

BRIEF DESCRIPTION OF THE DRAWINGS

FIG. 1 is a field-emission scanning electron microscope (FE-SEM) image showing the surface of a cathode active material including a metal oxide coating layer prepared according to Example 4 of the present invention;

FIG. 2 is an FE-SEM image showing the surface of a cathode active material including a metal oxide coating layer prepared according to Example 5 of the present invention; and FIG. 3 is an FE-SEM image showing the surface of a cathode active material including a metal oxide coating layer prepared according to Example 6 of the present invention.

MODE FOR CARRYING OUT THE INVENTION

Hereinafter, the present invention will be described in detail.

Recently, the need for using a cathode of a lithium ion secondary battery at a high voltage increases, and accordingly, research into methods for preparing a cathode active material having excellent high-temperature stability, low manufacturing costs, excellent capacity, and excellent cycle characteristics has emerged. For example, in order to improve thermal stability and cycle characteristics, a method of coating the surface of a cathode active material with a metal oxide using a typical dry or wet coating method has been proposed. However, since it is difficult to coat the metal oxide to have a uniform thickness by the typical method, the degree of improvement is still insufficient. For example, the dry coating method has advantages in that the process is simple and cost is low, but has disadvantages in that it is difficult to form a metal oxide coating layer having a uniform thickness on the surface of a cathode active material. The wet coating method may form a metal oxide coating layer having a uniform thickness. However, the wet coating method has disadvantages in that anions capable of degrading battery characteristics may not only remain on the surface of the metal oxide coating layer, but it may also be difficult to form (coat) a metal oxide layer having a uniform thickness which may further improve charge and discharge efficiency.

Accordingly, the present invention aims at providing a method of manufacturing a cathode active material coating solution capable of forming a metal oxide coating layer having a uniform thickness which may address limitations of typical coating methods and may simultaneously improve charge and discharge efficiency on the surface of a cathode active material for a secondary battery, and a coating solution manufactured by the above method. In particular, with respect to the coating solution manufactured by the method of the present invention, since anions, which are present in a typical wet coating solvent to degrade battery characteristics, are not included, the charge and discharge efficiency of the cathode may be further improved.

Specifically, according to an embodiment of the present invention, provided is a method of manufacturing a cathode active material coating solution for a secondary battery including:

preparing a mixed solution by dispersing a metal precursor and a chelating agent in a glycol-based solvent;

performing primary heating on the mixed solution; and performing secondary heating on the mixed solution.

First, in the method of the present invention, the glycol-based solvent is a component added to function as a reactant which forms a metal organo-compound by combining (reacting) with a metal desorbed from the metal precursor during a heating process. Typical examples of the glycol-based solvent may include solvents having a boiling point (bp) of 120° C. to 400° C., for example, a single material selected from the group consisting of ethylene glycol (bp 197° C.), propylene glycol (bp 188° C.), diethylene glycol (bp 245° C.), triethylene glycol (bp 285° C.), and polyethylene glycol, or a mixture of two or more thereof, but the present invention is not particularly limited thereto. In the case that a solvent having a boiling point of less than 120° C. is used as the glycol-based solvent, since the binding reaction with the metal desorbed from the metal precursor does not occur, the metal organo-compound may be difficult to be formed.

In this case, in the method of the present invention, the metal precursor is not particularly limited so long as it includes a typical metal, and for example, the metal precursor may include a single material selected form the group consisting of acetate, hydroxide, nitrate, nitride, sulfate, sulfide, alkoxide, and halide, which include at least one metal selected form the group consisting of magnesium (Mg), calcium (Ca), strontium (Sr), barium (Ba), yttrium (Y), titanium (Ti), zirconium (Zr), vanadium (V), niobium (Nb), tantalum (Ta), chromium (Cr), molybdenum (Mo), tungsten (W), manganese (Mn), iron (Fe), cobalt (Co), iridium (Ir), nickel (Ni), zinc (Zn), aluminum (Al), gallium (Ga), indium (In), silicon (Si), germanium (Ge), tin (Sn), lanthanum (La), and cerium (Ce), or a mixture of two or more thereof. Specifically, typical examples of the metal precursor may be aluminum acetate, zirconium nitride, or manganese acetate.

Also, in the method of the present invention, the chelating agent is a component added to facilitate the binding between the glycol-based solvent and the metal by easily desorbing the metal from the metal precursor, and typical examples of the chelating agent may include a single material selected from the group consisting of citric acid, ethylenediaminetetraacetic acid (EDTA), oxalic acid, and gluconic acid, or a mixture of two or more thereof.

Also, in the method of the present invention, a content ratio (parts by weight) of the metal precursor:the glycol-based solvent:the chelating agent may be in a range of 1:1:0.1 to 1:500:20, for example, 1:1:0.1 to 1:100:20.

In the case that the amount of the glycol-based solvent is less than 1 part by weight, the metal desorbed from the metal precursor may not entirely react with the glycol-based solvent to remain in a state of the metal precursor. Also, in the case in which the amount of the glycol-based solvent is greater than 500 parts by weight, since a large amount of the glycol-based solvent not participating in the reaction must be removed by being evaporated during the heating after the reaction, the consumption of energy and the glycol-based solvent may be large and side reactions may occur in a solvent evaporation process. Furthermore, in the case that the amount of the chelating agent is less than 0.1 parts by weight, the effect of the chelating agent may not be sufficiently obtained. In the case in which the amount of the chelating agent is greater than 20 parts by weight, since a large amount of the chelating agent preferentially reacts with the metal precursor to inhibit the reaction between the glycol-based solvent and the metal precursor, a desired yield of the metal organo-compound may be reduced.

Also, in the method of the present invention, an additive may be further included when preparing the mixed solution.

The additive may improve the yield of metal oxide by being included as a catalyst component which promotes the reaction between the metal desorbed from the metal precursor and the glycol-based solvent. The additive may be a component which does not remain later in a coating layer by being entirely evaporated and removed during the heating. Typical examples of the additive may include a single material selected from the group consisting of formaldehyde, acetaldehyde, and glycolic acid, or a mixture of two or more thereof.

The additive may be included in an amount of 0.1 parts by weight to 20 parts by weight based on total 1 part by weight of the metal precursor. In the case that the amount of the additive is greater than 20 parts by weight, there may be a possibility that a large amount of byproducts may be formed due to the occurrence of side reactions.

Also, in the method of the present invention, the performing of the primary heating may be performed at a temperature below a boiling point of the glycol-based solvent, as a temperature at which the reaction is initiated, to a temperature above the boiling point. Specifically, the performing of the primary heating may be performed in a temperature range of 100° C. to 300° C., for example, 110° C. to 230° C., for 1 hour to 48 hours, for example, 5 hours to 20 hours. The performing of the primary heating may be performed in which a time at which all metal of the metal precursor react with the glycol-based solvent to form the metal organo-compound is set as a termination point.

A viscosity of the mixed solution after the primary heating may be in a range of about 1 cps (centipoise) to about 1,000 cps, and specifically, the mixed solution may have a viscosity similar to the glycol-based solvent.

Furthermore, in the method of the present invention, the performing of the secondary heating may be immediately performed with no time interval, such as a cooling process, after the primary heating. In this case, the performing of the secondary heating may be performed at a temperature near the boiling point of the glycol-based solvent or thereabove. Specifically, the performing of the secondary heating may be performed in a temperature range of 100° C. to 300° C., for example, 170° C. to 250° C., for 1 hour to 5 hours. For example, in the case that ethylene glycol is used as the glycol-based solvent, the performing of the secondary heating may be performed at a temperature of about 180° C. or more for 1 hour to 5 hours.

The performing of the secondary heating may be performed until a termination point at which the glycol-based solvent used as a reactant is sufficiently removed to form a metal glycolate solution. Thus, the performing of the secondary heating may be referred to as "heating and concentrating". In this case, the metal glycolate solution may have a viscosity of 1 cps to 15,000 cps, specifically, 200 cps to 5,000 cps, for example, 1,000 cps to 3,000 cps.

In the method of the present invention, the performing of the primary heating and the performing of the secondary heating may be performed in an inert gas atmosphere such as argon (Ar).

In the case that the metal glycolate solution is prepared by the performing of the secondary heating of the present invention, a concentration of the coating solution may be easily adjusted during the preparation of the cathode active material including the metal coating layer, and thus, the effectiveness of coating may be improved by controlling coating conditions according to the concentration of the coating solution.

That is, in the present invention, a glycol-based solvent (e.g., ethylene glycol), a metal precursor, and a chelating agent (e.g., citric acid) are mixed to prepare a mixed solution, and coordination bonds are then formed between oxygen of the glycol-based solvent and the chelating agent and metal ions desorbed from the metal precursor while hydrogen of the glycol-based solvent and the chelating agent is desorbed as in the following reaction formula during heating (concentrating) the mixed solution. As a result, a metal glycolate coating solution including metal organo-compounds represented by the following Chemical Formulae 1 to 3 as main components is obtained while a metal desorbed from the metal precursor, the glycol-based solvent, and the chelating agent are combined together.

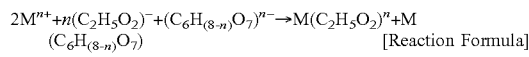  [Reaction Formula]

  [Chemical Formula 1]

  [Chemical Formula 2]

  [Chemical Formula 3]

(where M, as the metal desorbed from the metal precursor, represents at least one metal selected from the group consisting of Mg, Ca, Sr, Ba, Y, Ti, Zr, V, Nb, Ta, Cr, Mo, W, Mn, Fe, Co, Ir, Ni, Zn, Al, Ga, In, Si, Ge, Sn, La, and Ce, and n is an integer between 1 and 4.)

Also, according to another embodiment of the present invention, a metal glycolate coating solution including a metal organo-compound, which is prepared by the above method, i.e., a cathode active material coating solution, is provided. Specifically, the present invention may provide a metal glycolate coating solution including at least one metal organo-compound selected from the group consisting of metal organo-compounds represented by the following Chemical Formulae 1 to 3 in which a metal desorbed from a metal precursor, a glycol-based solvent, and a chelating agent are combined.

  [Chemical Formula 1]

  [Chemical Formula 2]

  [Chemical Formula 3]

(where M, as the metal desorbed from the metal precursor, represents at least one metal selected from the group consisting of Mg, Ca, Sr, Ba, Y, Ti, Zr, V, Nb, Ta, Cr, Mo, W, Mn, Fe, Co, Ir, Ni, Zn, Al, Ga, In, Si, Ge, Sn, La, and Ce, and n is an integer between 1 and 4.)

Since the cathode active material coating solution manufactured by the method of the present invention may include two or more metal organo-compounds represented by Chemical Formulae 1 to 3, the surface of the cathode active material may be coated with two or more metal oxide layers having a uniform thickness. Furthermore, with respect to the cathode active material coating solution of the present invention, since anions present in a typical wet coating solvent are not included, various metal oxide coating layers may be formed while minimizing the effect of the anions which may degrade battery characteristics on the surface of the cathode active material.

Also, the present invention may provide a cathode active material for a secondary battery in which a metal oxide coating layer having a uniform thickness is formed using the metal glycolate coating solution of the present invention.

In this case, the metal glycolate coating solution of the present invention is diluted in an organic solvent and the metal oxide coating layer may then be formed by mixing with a cathode active material using a typical wet mixing method.

In this case, the cathode active material is not particularly limited so long as it may be used in a typical lithium secondary battery, and for example, any one selected from the group consisting of $LiCoO_2$, $LiNiO_2$, $LiMnO_2$, $LiMn_2O_4$, $Li(Ni_aCo_bMn_c)O_2$ ($0<a<1$, $0<b<1$, $0<c<1$, $a+b+c=1$), $LiNi_{1-y}Co_yO_2$, $LiCo_{1-y}Mn_yO_2$, $LiNi_{1-y}Mn_yO_2$ ($0\leq y\leq 1$), $Li(Ni_aMn_bCo_c)O_4$ ($0<a<2$, $0<b<2$, $0<c<2$, $a+b+c=2$), $LiMn_{2-z}Ni_zO_4$, $LiMn_{2-z}Co_zO_4$ ($0<z<2$), $LiCoPO_4$, and $LiFePO_4$, or a mixture of two or more thereof may be used. Also, sulfide, selenide, and halide may be used in addition to the above oxides.

Furthermore, the present invention provides a cathode for a secondary battery including a cathode collector and a cathode active material for a secondary battery, in which the surface thereof is coated with the coating solution, coated on the cathode collector.

In general, the cathode collector is fabricated to have a thickness of about 3 μm to about 500 μm. The cathode collector is not particularly limited so long as it has high conductivity without causing adverse chemical changes in the batteries. The cathode collector may be formed of, for example, stainless steel, aluminum, nickel, titanium, fired carbon, or aluminum or stainless steel that is surface-treated with one of carbon, nickel, titanium, silver, or the like. The collector may have an uneven surface to improve the bonding strength of a cathode active material and may have any of various shapes such as that of a film, a sheet, a foil, a net, a porous body, a foam body, a non-woven fabric body, and the like.

Also, according to an embodiment of the present invention, a lithium secondary battery composed of the cathode including the cathode active material, an anode, a separator, and a lithium salt-containing non-aqueous electrolyte solution is provided.

The anode, for example, is prepared by coating an anode collector with an anode material including an anode active material and then drying the anode collector. If necessary, components, such as a conductive agent, a binder, and a filler, may be included in the anode material.

The anode collector is generally fabricated to have a thickness of about 3 μm to about 500 μm. The anode collector is not particularly limited so long as it has conductivity without causing adverse chemical changes in the batteries. The anode collector may be formed of, for example, copper, stainless steel, aluminum, nickel, titanium, fired carbon, copper or stainless steel that is surface-treated with one of carbon, nickel, titanium, silver, or the like, an aluminum-cadmium alloy, or the like. Also, like the cathode collector, the anode collector may have a fine roughness surface to improve bonding strength with an anode active material. The anode collector may have various shapes such as a film, a sheet, a foil, a net, a porous body, a foam body, a non-woven fabric body, and the like.

The separator is disposed between the cathode and the anode, and a thin insulating film having high ion permeability and mechanical strength is used. The separator typically has a pore diameter of 0.01 μm to 10 μm and a thickness of 5 μm to 300 μm.

For example, sheets or non-woven fabrics formed of an olefin-based polymer such as polypropylene; glass fibers or polyethylene, which have chemical resistance and hydrophobicity, are used as the separator. When a solid electrolyte, such as a polymer, is used as an electrolyte, the solid electrolyte may also serve as the separator.

The lithium salt-containing non-aqueous electrolyte solution is formed of an electrolyte and a lithium salt, and a non-aqueous organic solvent or an organic solid electrolyte may be used as the electrolyte solution.

Examples of the non-aqueous organic solvent may include aprotic organic solvents, such as N-methyl-2-pyrrolidone, propylene carbonate, ethylene carbonate, butylene carbonate, dimethyl carbonate, diethyl carbonate, γ-butyrolactone, 1,2-dimethoxy ethane, tetrahydroxyfuran, 2-methyl tetrahydrofuran, dimethyl sulfoxide, 1,3-dioxolane, formamide, diemthylformamide, dioxolane, acetonitrile, nitromethane, methyl formate, methyl acetate, phosphate triester, trimethoxy methane, a dioxolane derivative, sulfolane, methyl sulfolane, 1,3-dimethyl-2-imidazolidinone, a propylene carbonate derivative, a tetrahydrofuran derivative, ether, methyl propionate, and ethyl propionate.

Examples of the organic solid electrolyte may include a polyethylene derivative, a polyethylene oxide derivative, a polypropylene oxide derivative, a phosphate ester polymer, poly agitation lysine, polyester sulfide, polyvinyl alcohol, polyvinylidene fluoride, and a polymer containing an ionic dissociation group.

The lithium salt is a material that is readily soluble in the non-aqueous electrolyte and for example, may include LiCl, LiBr, LiI, LiClO$_4$, LiBF$_4$, LiB$_{10}$Cl$_{10}$, LiPF$_6$, LiCF$_3$SO$_3$, LiCF$_3$CO$_2$, LiAsF$_6$, LiSbF$_6$, LiAlCl$_4$, CH$_3$SO$_3$Li, CF$_3$SO$_3$Li, (CF$_3$SO$_2$)$_2$NLi, chloroborane lithium, lower aliphatic carboxylic acid lithium, lithium tetraphenyl borate and imide.

Also, in order to improve charge/discharge characteristics and flame retardancy, pyridine, triethylphosphite, triethanolamine, cyclic ether, ethylenediamine, n-glyme, hexaphosphoric triamide, a nitrobenzene derivative, sulfur, a quinone imine dye, N-substituted oxazolidinone, N,N-substituted imidazolidine, ethylene glycol dialkyl ether, an ammonium salt, pyrrole, 2-methoxy ethanol, and aluminum trichloride, for example, may be added to the electrolyte solution. In some cases, halogen-containing solvents, such as carbon tetrachloride and ethylene trifluoride, may be further included in order to impart incombustibility, and carbon dioxide gas may be further included in order to improve high-temperature storage characteristics.

Hereinafter, the present invention will be described in detail, according to specific examples. The invention may, however, be embodied in many different forms and should not be construed as being limited to the embodiments set forth herein. Rather, these example embodiments are provided so that this description will be thorough and complete, and will fully convey the scope of the present invention to those skilled in the art.

EXAMPLES

Example 1. Preparation of Cathode Active Material Coating Solution 20 g of aluminum acetate (Al(C$_2$H$_3$O$_2$)$_3$) and 20 g of citric acid (C$_6$H$_8$O$_7$) were dispersed in 200 g of an ethylene glycol (C$_2$H$_6$O$_2$) solution and then stirred to prepare a mixed solution. The mixed solution was primarily heated with stirring at a temperature of 141° C. for 5 hours and then secondarily heated at a temperature of 180° C. for 1 hour until the mixed solution was concentrated (about 1,000 cps) to manufacture a cathode active material coating solution (1) including metal organo-compounds represented by the following Chemical Formulae 1a and 2a as main components.

Al(C$_2$H$_5$O$_2$)$_3$                  [Chemical Formula 1a]

Al(C$_6$H$_5$O$_7$)                    [Chemical Formula 2a]

Example 2. Preparation of Cathode Active Material Coating Solution 40 g of zirconium nitride (ZrN) and 10 g of citric acid (C$_6$H$_8$O$_7$) were dispersed in 200 g of an ethylene glycol (C$_2$H$_6$O$_2$) solution and then stirred to prepare a mixed solution. The mixed solution was primarily heated with stirring at a temperature of 150° C. for 5 hours and then secondarily heated at a temperature of 180° C. for 1 hour until the mixed solution was concentrated (about 1,000 cps) to manufacture a cathode active material coating solution (2) including metal organo-compounds represented by the following Chemical Formulae 1b and 3a as main components.

Zr(C$_2$H$_5$O$_2$)$_4$                  [Chemical Formula 1b]

Zr(C$_6$H$_5$O$_7$)(C$_2$H$_5$O$_2$)           [Chemical Formula 3a]

Example 3. Preparation of Cathode Active Material Coating Solution 70 g of manganese acetate (Mn(CH$_3$O$_2$)$_2$), 20 g of citric acid (C$_6$H$_8$O$_7$), and 5 g of formaldehyde were dispersed in 400 g of an ethylene glycol (C$_2$H$_6$O$_2$) solution and then stirred to prepare a mixed solution. The mixed solution was primarily heated with stirring at a temperature of 140° C. for 4 hours and then secondarily heated at a temperature of 180° C. for 1 hour until the mixed solution was concentrated (about 1,000 cps) to manufacture a cathode active material coating solution (3) including metal organo-compounds represented by the following Chemical Formulae 1c and 2c as main components.

$Mn(C_2H_5O_2)_m$ [Chemical Formula 1c]

$Mn(C_6H_5O_7)$ [Chemical Formula 2c]

(where m is an integer between 1 and 3.)

Example 4. Preparation of Cathode Active Material Including Metal Oxide Coating Layer While adding 2 g of the cathode active material coating solution of Chemical Formula 1 manufactured in Example 1 to 8 g of ethanol and stirring, 50 g of a cathode active material ($LiNi_{0.6}Mn_{0.2}Co_{0.2}O_2$) was added thereto and stirred in a paste state. The stirred paste was dried at 180° C. for 2 hours and then heat-treated at 800° C. in air for 1 hour to prepare cathode active material particles coated with about 0.2 wt % of an aluminum oxide layer.

The results of field-emission scanning electron microscope (FE-SEM) and energy dispersive spectrometer (EDS) analysis of the surface of the prepared cathode active material are presented in Table 1 below (see FIG. 1).

TABLE 1

| Element | Wt % |
|---|---|
| Al | 0.49 |
| Ni | 28.6 |
| Mn | 9.92 |
| Co | 9.84 |
| O | 51.15 |
| Total | 100 |

Referring to FIG. 1, amounts of elements in a portion marked as "spectrum 4" in an FE-SEM image were analyzed by EDS. As a result, it may be understood that cathode materials of Ni, Mn, and Co were present in the form of an oxide and the amount of Al as a coating material was analyzed to be 0.49 wt %. Furthermore, it may be confirmed that the surface of the cathode active material was very clean in the FE-SEM image, and thus, it may be understood that Al was very uniformly coated.

Example 5. Preparation of Cathode Active Material Including Metal Oxide Coating Layer While adding 2 g of the cathode active material coating solution manufactured in Example 2 to 8 g of ethanol and stirring, 50 g of a cathode active material ($LiNi_{0.6}Mn_{0.2}Co_{0.2}O_2$) was added thereto and stirred in a paste state. The stirred paste was dried at 180° C. for 2 hours and then heat-treated at 500° C. in air for 1 hour to prepare cathode active material particles coated with about 0.2 wt % of a zirconium oxide layer.

The results of FE-SEM and EDS analysis of the surface of the prepared cathode active material are presented in Table 2 below (see FIG. 2).

TABLE 2

| Element | Wt % |
|---|---|
| Zr | 0.72 |
| Ni | 32.50 |
| Mn | 10.82 |
| Co | 10.99 |
| O | 44.97 |
| Total | 100 |

Referring to FIG. 2, amounts of elements in a portion marked as "spectrum 11" in an FE-SEM image were analyzed by EDS. As a result, it may be understood that cathode materials of Ni, Mn, and Co were present in the form of an oxide and the amount of Zr as a coating material was analyzed to be 0.72 wt %. Furthermore, it may be confirmed that the surface of the cathode active material was very clean in the FE-SEM image, and thus, it may be understood that Zr was very uniformly coated.

Example 6. Preparation of Cathode Active Material Including Metal Oxide Coating Layer While adding 2 g of the cathode active material coating solution manufactured in Example 3 to 8 g of ethanol and stirring, 50 g of a cathode active material ($LiNi_{0.6}Mn_{0.2}Co_{0.2}O_2$) was added thereto and stirred in a paste state. The stirred paste was dried at 180° C. for 2 hours and then heat-treated at 700° C. in air for 1 hour to prepare cathode active material particles coated with about 0.2 wt % of a manganese oxide layer.

The results of FE-SEM and EDS analysis of the surface of the prepared cathode active material are presented in Table 3 below (see FIG. 3).

TABLE 3

| Element | Wt % |
|---|---|
| Ni | 46.51 |
| Mn | 11.61 |
| Co | 10.46 |
| O | 31.42 |
| Total | 100 |

Referring to FIG. 3, amounts of elements in a portion marked as "spectrum 6" in an FE-SEM image were analyzed by EDS. As a result, it may be understood that cathode materials of Ni, Mn, and Co were present in the form of an oxide and the amount of Mn as a coating material was analyzed to be 11.61 wt %. Thus, when compared with 10.45 wt % of Co, it may be understood that about 1 wt % of Mn was coated by the Mn coating. Furthermore, it may be confirmed that the surface of the cathode active material was very clean in the FE-SEM image, and thus, it may be understood that Mn was very uniformly coated.

The invention claimed is:

1. A method of manufacturing a cathode active material coating solution for a secondary battery, the method consisting of:
   preparing a mixed solution by dispersing a metal precursor, a chelating agent, and an additive in a glycol-based solvent,
   wherein the metal precursor is selected from the group consisting of acetate, hydroxide, nitrate, nitride, sulfate, sulfide, alkoxide, and halide, which include at least one metal selected form the group consisting of magnesium (Mg), calcium (Ca), strontium (Sr), barium (Ba), yttrium (Y), titanium (Ti), zirconium (Zr), vanadium (V), niobium (Nb), tantalum (Ta), chromium (Cr), molybdenum (Mo), tungsten (W), manganese (Mn), iron (Fe), cobalt (Co), iridium (Ir), nickel (Ni), zinc (Zn), aluminum (Al), gallium (Ga), indium (In), silicon (Si), germanium (Ge), tin (Sn), lanthanum (La), cerium (Ce), and a mixture of two or more thereof; and wherein the additive is selected from the group consisting of formaldehyde, acetaldehyde and glycolic acid, and a mixture of two or more thereof;

performing a primary heating on the mixed solution to form a primary heated solution; and performing a secondary heating on the heated solution to form a secondary heated solution to form the cathode active material coating solution, wherein the coating solution is a metal glycolate coating solution comprising at least one metal organo-compound selected from the group consisting of compounds represented by Chemical Formulae 1 to 3 in which a metal desorbed from a metal precursor, a glycol-based solvent, and a chelating agent are combined:

$M(C_2H_5O_2)_n$      [Chemical Formula 1]

$M(C_6H_{(8-n)}O_7)$      [Chemical Formula 2]

$M(C_6H_{(8-n)}O_7)(C_2H_5O_2)$      [Chemical Formula 3]

wherein M, as the metal desorbed from the metal precursor, represents at least one metal selected from the group consisting of magnesium (Mg), calcium (Ca), strontium (Sr), barium (Ba), yttrium (Y), titanium (Ti), zirconium (Zr), vanadium (V), niobium (Nb), tantalum (Ta), chromium (Cr), molybdenum (Mo), tungsten (W), manganese (Mn), iron (Fe), cobalt (Co), iridium (Ir), nickel (Ni), zinc (Zn), aluminum (Al), gallium (Ga), indium (In), silicon (Si), germanium (Ge), tin (Sn), lanthanum (La), and cerium (Ce), and n is an integer between 1 and 4.

2. The method of claim 1, wherein the glycol-based solvent comprises a single material selected from the group consisting of ethylene glycol, propylene glycol, diethylene glycol, triethylene glycol, and polyethylene glycol, or a mixture of two or more thereof.

3. The method of claim 1, wherein the metal precursor is aluminum acetate, zirconium nitride, or manganese acetate.

4. The method of claim 1, wherein the chelating agent comprises a single material selected from the group consisting of citric acid, ethylenediaminetetraacetic acid (EDTA), oxalic acid, and gluconic acid, or a mixture of two or more thereof.

5. The method of claim 1, wherein a content ratio (parts by weight) of the metal precursor:the glycol-based solvent: the chelating agent is in a range of 1:1:0.1 to 1:500:20.

6. The method of claim 1, wherein the additive is included in an amount of 0.1 parts by weight to 20 parts by weight based on total 1 part by weight of the metal precursor.

7. The method of claim 1, wherein the performing of the primary heating is performed in a temperature range of 100° C. to 300° C. for 1 hour to 48 hours.

8. The method of claim 7, wherein the performing of the primary heating is performed in a temperature range of 110° C. to 230° C. for 5 hours to 20 hours.

9. The method of claim 1, wherein the performing of the secondary heating is performed in a temperature range of 150° C. to 300° C. for 1 hour to 5 hours.

10. The method of claim 9, wherein the performing of the secondary heating is performed in a temperature range of 170° C. to 250° C. for 1 hour to 5 hours.

11. The method of claim 1, wherein the performing of the primary heating and the performing of the secondary heating are performed in an inert gas atmosphere.

12. The method of claim 1, wherein the primary heated solution has a viscosity of about 1 cps to about 1,000 cps.

13. The method of claim 1, wherein the secondary heated solution has a viscosity of 1 cps to 15,000 cps.

14. A method of manufacturing a cathode active material coating solution for a secondary battery, the method consisting of:

preparing a mixed solution by dispersing a metal precursor, a chelating agent, and optionally an additive in a glycol-based solvent, wherein the metal precursor is selected from the group consisting of acetate, hydroxide, nitrate, nitride, sulfate, sulfide, alkoxide, and halide, which include at least one metal selected form the group consisting of magnesium (Mg), calcium (Ca), strontium (Sr), barium (Ba), yttrium (Y), titanium (Ti), zirconium (Zr), vanadium (V), niobium (Nb), tantalum (Ta), chromium (Cr), molybdenum (Mo), tungsten (W), manganese (Mn), iron (Fe), cobalt (Co), iridium (Ir), nickel (Ni), zinc (Zn), aluminum (Al), gallium (Ga), indium (In), silicon (Si), germanium (Ge), tin (Sn), lanthanum (La), cerium (Ce), and a mixture of two or more thereof; and wherein the additive is selected from the group consisting of formaldehyde, acetaldehyde and glycolic acid, and a mixture of two or more thereof;

performing a primary heating on the mixed solution to form a primary heated solution; and performing a secondary heating on the heated solution to form a secondary heated solution to form the cathode active material coating solution, wherein the coating solution is a metal glycolate coating solution comprising at least one metal organo-compound selected from the group consisting of compounds represented by Chemical Formulae 1 to 3 in which a metal desorbed from a metal precursor, a glycol-based solvent, and a chelating agent are combined:

$M(C_2H_5O_2)_n$      [Chemical Formula 1]

$M(C_6H_{(8-n)}O_7)$      [Chemical Formula 2]

$M(C_6H_{(8-n)}O_7)(C_2H_5O_2)$      [Chemical Formula 3]

wherein M, as the metal desorbed from the metal precursor, represents at least one metal selected from the group consisting of magnesium (Mg), calcium (Ca), strontium (Sr), barium (Ba), yttrium (Y), titanium (Ti), zirconium (Zr), vanadium (V), niobium (Nb), tantalum (Ta), chromium (Cr), molybdenum (Mo), tungsten (W), manganese (Mn), iron (Fe), cobalt (Co), iridium (Ir), nickel (Ni), zinc (Zn), aluminum (Al), gallium (Ga), indium (In), silicon (Si), germanium (Ge), tin (Sn), lanthanum (La), and cerium (Ce), and n is an integer between 1 and 4.

15. The method of claim 14, wherein the glycol-based solvent comprises a single material selected from the group consisting of ethylene glycol, propylene glycol, diethylene glycol, triethylene glycol, and polyethylene glycol, or a mixture of two or more thereof.

16. The method of claim 14, wherein the metal precursor is aluminum acetate, zirconium nitride, or manganese acetate.

17. The method of claim 14, wherein the chelating agent comprises a single material selected from the group consisting of citric acid, ethylenediaminetetraacetic acid (EDTA), oxalic acid, and gluconic acid, or a mixture of two or more thereof.

18. The method of claim 14, wherein a content ratio (parts by weight) of the metal precursor:the glycol-based solvent:the chelating agent is in a range of 1:1:0.1 to 1:500:20.

* * * * *